United States Patent [19]

Stahl

[11] Patent Number: 5,140,631
[45] Date of Patent: Aug. 18, 1992

[54] APPARATUS AND METHOD FOR DETERMINING THE STATE OF A TELEPHONE LINE

[75] Inventor: Karl-Erik Stahl, Varmdo, Sweden
[73] Assignee: Intertex Data AB, Sundbyberg, Sweden
[21] Appl. No.: 591,940
[22] Filed: Oct. 2, 1990
[51] Int. Cl.⁵ .............................................. H04M 3/22
[52] U.S. Cl. ..................................... 379/377; 379/379
[58] Field of Search ................... 379/92, 93, 106, 107, 379/274, 277, 373, 377–381

[56] References Cited

U.S. PATENT DOCUMENTS

| | | | |
|---|---|---|---|
| 4,220,825 | 9/1980 | Fahey | 379/380 |
| 4,224,478 | 9/1980 | Fahey et al. | 379/380 |
| 4,433,212 | 2/1984 | Moses et al. | 379/29 |
| 4,679,229 | 7/1987 | Yamaguchi | 379/373 |
| 4,845,741 | 7/1989 | Fourdraine | 379/106 |
| 4,958,371 | 9/1990 | Damoci et al. | 379/107 |
| 4,987,586 | 1/1991 | Gross et al. | 379/93 |

OTHER PUBLICATIONS

J. Cook et al., "General Electric Optoelectronics Manual", ©1976, pp. 70–72.

*Primary Examiner*—James L. Dwyer
*Assistant Examiner*—Wing F. Chan

[57] ABSTRACT

A line state detector for a telephone line tests a voltage derived from the telephone line by closing a switch in series with a voltage sensing circuit in response to a polling signal. A modem testing the line state go Off-Hook immediately after it finds that the line was in On-Hook state, so it can use a low impedance voltage sensor directly on the telephone line. Monitoring equipment will need a line state detector with high impedance, which can be achieved by a high impedance in series with a capacitor. The capacitor voltage can then be tested by a low impedance sensing circuit.

4 Claims, 2 Drawing Sheets

APPARATUS AND METHOD FOR DETERMINING THE STATE OF A TELEPHONE LINE

BACKGROUND OF THE INVENTION

The present invention pertains to telephones, facsimile machines, computer modems, automatic alarm dialers, and similar equipment, and specifically to detection apparatus in such equipment for ascertaining whether a telephone line is in On-Hook or Off-Hook condition.

A residential or business user might connect more than one device to one common telephone line. When one of the devices has an auto-dialing function, such as in a facsimile machine or a modem, problems will arise if the telephone line is in use (Off-Hook) when the automatic device attempts to dial a number. The automatic device thus should be able to detect whether the telephone is Off-Hook or On-Hook before dialing is attempted. Many telephone companies will not allow the use of automatic dialing equipment on their lines unless they contain line state detectors that block dialing attempts when the line is Off-Hook.

A telephone line in On-Hook condition has no current flow, and the line voltage is high, typically 50 V DC. A telephone line in Off-Hook condition sees a current consumption of 10–50 mA DC, and the line voltage is low, about 1–10 V DC. The line state can thus be detected either by sensing the current in the line, or by sensing the line voltage.

Devices other than ordinary telephones must have a line interface between the telephone line and the data circuits in the device. Such a line interface must provide a proper impedance match between the telephone line and the data circuits in the device, and it must also separate the data circuits galvanically from the telephone line. The galvanic separation is achieved by the use of transformers, relays or opto-couplers, or by a combination of such components.

Most of the presently used devices for detecting the state of a telephone line rely on sensing the current in the telephone line, usually by connecting a relay directly in series with the telephone wires. The relay coil must have low resistance, typically max 20 ohm, in order not to cause too much voltage drop in the line, and the relay must close at a current of 10 mA DC or less in the coil. The relay coil must also be shunted by a large bipolar capacitor, typically about 50 uF, to avoid attenuation of high frequency signals. Some telephone companies specify that the relay must have two coils, each with a shunt capacitor, in order to maintain symmetry on the telephone line. This known line state detector works well, but the components are expensive and bulky.

The current in the telephone line could also be sensed by means of an opto-coupler instead of a relay, but this introduces a constant voltage threshold of about 1 V in the telephone line, which is not acceptable to many telephone companies. Therefore, this method is rarely used.

A line state detector could also be based on sensing of line voltage instead of line current. Such a voltage sensing line state detector is described in U.S. Pat. No. 4,647,723. This device needs an amplifier in the voltage sensing circuit, because most telephone companies do not allow more than a few microampere drain on the telephone line in On-Hook condition, and such a low current can not directly drive an output device providing galvanic separation. The amplifier needs power, which must be galvanically separated from all circuits outside the voltage sensing circuit, so a battery is included as power source. The known voltage sensing line state detector is complicated and expensive, and the battery is a bulky and inconvenient component.

SUMMARY OF THE INVENTION

The invention provides an apparatus for automatic detection of line state for a telephone line that is reliable, inexpensive, and very compact. This is achieved according to the invention by an apparatus for determining the state of a telephone line which comprises a resistor, a capacitor, means for connecting said resistor in series with said capacitor across said telephone line, a voltage sensing device, and means for connecting said voltage sensing device to said capacitor.

The invention further provides for a related method for the automatic detection of the telephone line state.

DETAILED DESCRIPTION OF THE PREFERRED EMBODIMENTS

Figure 1:
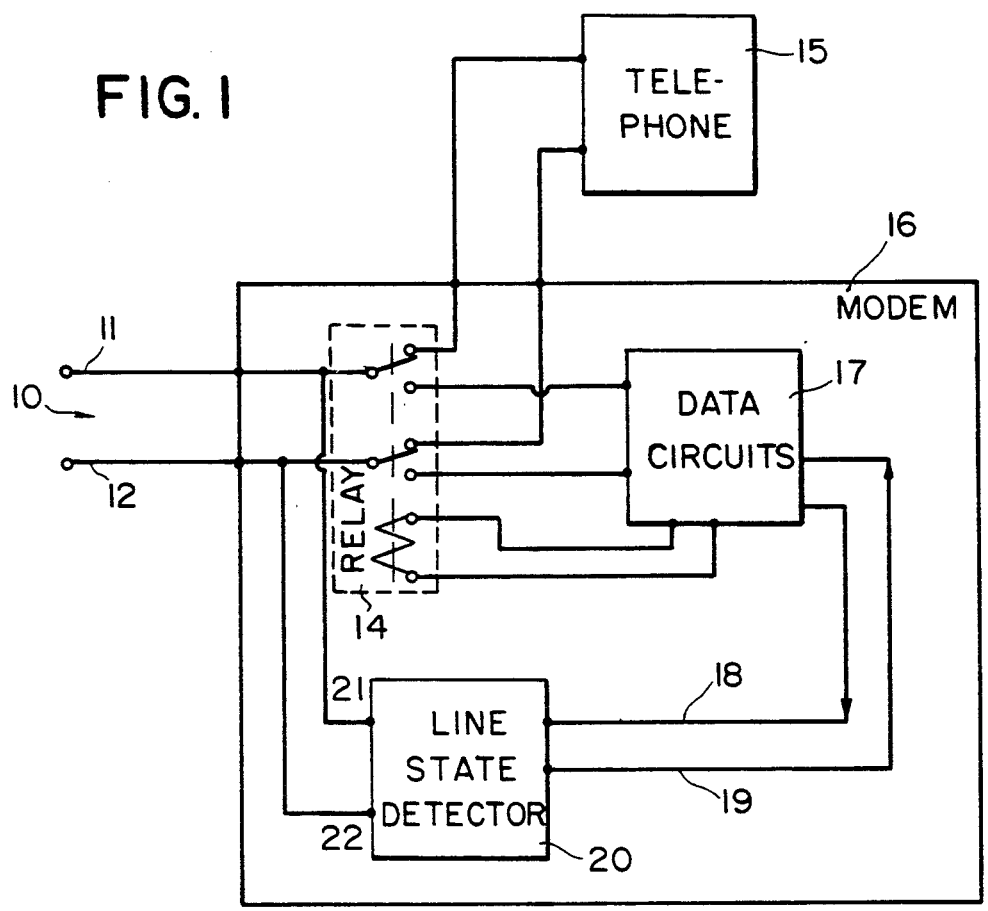
FIG. 1 is a block diagram of a telephone installation with a telephone and a modem with an apparatus for determining the state of a telephone line according to the invention connected to a telephone line.

FIG. 1 shows a modem 16 and a telephone 15 connected to a common telephone line 10. Both the telephone 15 and data circuits 17 in the modem 16 are connected to wires 11 and 12 of the telephone line 10 via contacts in a relay 14, which is part of the modem 16. The telephone line 10 is connected to the telephone 15 when the relay 14 is inactive, and to the data circuits 17 in modem 16 when the coil of relay 14 is energized. The data circuits 17 usually include a microprocessor with associated memory for control of the modem and the state of relay 14, as well as a line transformer and other data transmission components. When the modem 16 is activated for dialing, the data circuits 17 first check if the telephone line 10 is available, by polling a line state detector 20 via polling channel 18 and response channel 19. If the line 10 is in On-Hook condition, the data circuits 17 energize relay 14, and automatic dialing starts. If the telephone line 10 is in use, modem 16 waits for the line to become available before energizing relay 14 and start dialing.

The line state detector 20 is shown with only two terminals 21, 22 for the corresponding wires 11, 12 in the telephone line 10, so it senses only the voltage on the line 10, which is sufficient for a line state detector according to the invention. If a conventional line state detector based on relay coils in series with wires 11 and 12 were to be used, the wires 11, 12 would have to pass through the line state detector 20, so two terminals more than terminals 21, 22 would be required.

Figure 2:
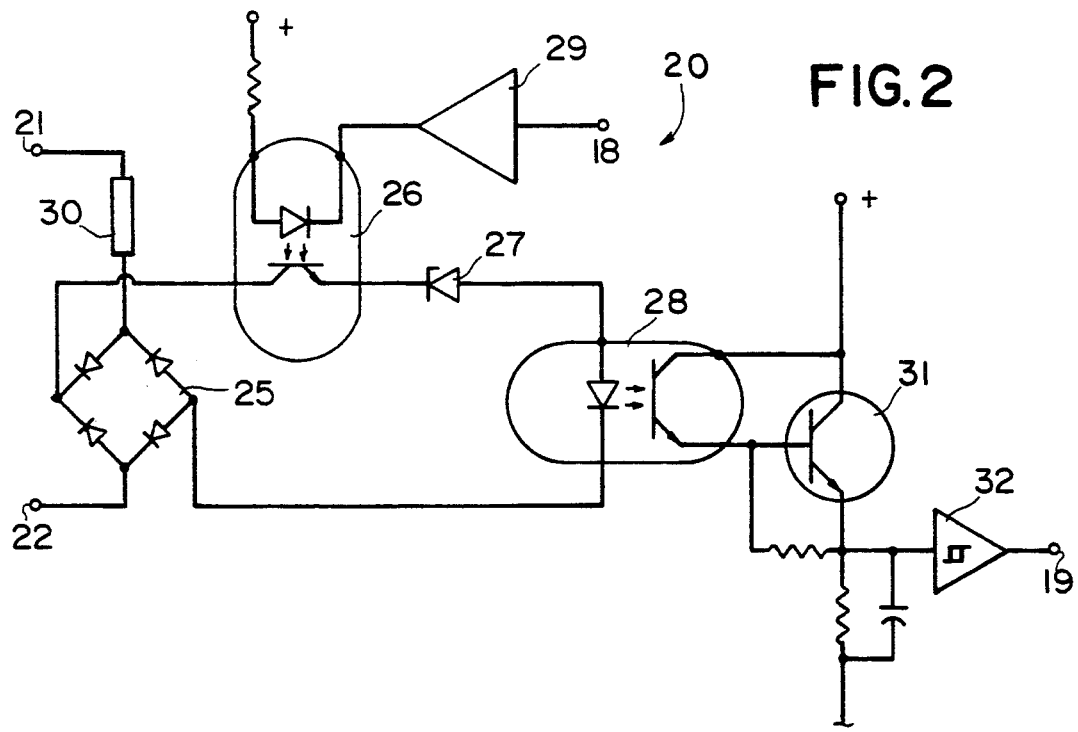
FIG. 2 is a circuit diagram for a first preferred embodiment of an apparatus for determining the state of a telephone line according to the invention.

A line state detector 20 according to the invention is shown in FIG. 2. A voltage sensing circuit, comprising an impedance 30 in series with a zener diode 27, with zener voltage about 20 V, and the control circuit of an opto-coupler 28, is connected in series with the output terminals of a second opto-coupler 26 to terminals 21 and 22, which are connected to the wires 11 and 12 of the telephone line 10 as shown in FIG. 1. A rectifier bridge 25 is also included in the circuit, as shown in FIG. 2. The control circuit of opto-coupler 26 is connected to the data circuits 17 in modem 16 via a buffer amplifier 29 and polling channel 18. The output terminals of opto-coupler 28 is connected to the data circuits 17 via buffer stages 31, 32 and response channel 19.

Opto-couplers 26 and 28 provide the required galvanic separation of circuits connected to the telephone line 10. There are no amplifiers in the circuits connected to the telephone line, so no isolated power supplies, such as batteries, are required.

When the modem 16 is in standby mode, no control current flows in the control circuit of opto-coupler 26, so its output circuit is normally open, and the current drain on the telephone line 10 is zero.

When modem 16 is activated, the data circuits 17 send a polling pulse via polling channel 18 and buffer amplifier 29 to opto-coupler 26, which causes the output circuit of opto-coupler 26 to close. The polarity of the voltage on terminals 21 and 22 depends on the polarity of wires 11, 12 in the telephone line 10, but the voltage after rectifier bridge 25 is always opposed to the zener diode 27. The combined threshold voltage in zener diode 27, the diodes in the bridge rectifier 25, and the diode in the control circuit of opto-coupler 28 effectively subtracts 23 V from the rectified voltage when the output circuit of opto-coupler 26 is closed.

If line 10 is in On-Hook state when the data circuits 17 poll the line state detector 20 via polling channel 18, the voltage on the line 10 is about 50 V, which is much larger than the combined threshold voltage in the voltage sensing circuit, so a current will flow through the control circuit of opto-coupler 28. If the impedance 30 is sufficiently low, the output circuit of opto-coupler 28 will close, and a square pulse will be returned to the data circuits 17 via response channel 19.

If, on the other hand, line 10 is in Off-Hook state when the line state detector 20 is polled via polling channel 18, the combined threshold voltage in the discharge circuit is larger than the voltage on line 10, so no current will flow in the control circuit of opto-coupler 28, and no pulse will be returned via response channel 19.

The data circuits 17 are designed to close relay 14 and start dialing only if a pulse is returned on response channel 19 after the line state detector 20 is polled via polling channel 18. This happens only when the line 10 is in On-Hook condition, so relay 14 will be closed only when telephone 15 is not in use.

The line state detector according to the invention, as described with reference to FIG. 2, is open circuited as long as opto-coupler 26 is open, so there is no requirement on the value of impedance 30 under this condition.

Only while the line state detector 20 is polled via polling channel 18, when opto-coupler 26 is closed, will there be a current load on line 10. A current load on an On-Hook line during testing for line state causes no problem, even in countries with very stringent requirements, if the line state detector 20 tests for line voltage only immediately before the modem 16 is about to connect itself to the telephone line 10 for dialing. If line 10 is in On-Hook state, the modem 16 at this point takes over, and the line switches to Off-Hook state, when the active line current is more than 10 mA. The value of impedance 30 does not matter in this case, it can even be zero. The threshold voltage in the voltage sensing circuit in FIG. 2 is about 23 V, so the line voltage will not drop below 23 V, even if impedance 30 is zero, before relay 14 closes and modem 16 goes Off-Hook. After the modem is Off-Hook, the voltage on line 10 drops to below 10 V, which is less than the threshold voltage in the voltage sensing circuit of the line state detector shown in FIG. 2, so the current in the line state detector will be zero, independent of the value of impedance 30. In practice an impedance value larger than zero will normally be used to limit the current in the voltage sensing circuit, but it is not difficult to get enough current in the sensing circuit to drive the opto-couplers directly. Note also that there is no requirement on the length of the polling pulse. A continuous polling signal starting at polling and ending only when the modem goes On-Hook again is acceptable.

If the telephone line 10 is in Off-Hook condition when the line state detector 20 is polled, on current will flow in the line state detector 20 when opto-coupler 26 is closed, because the combined threshold voltage in the voltage sensing circuit in this case is larger than the voltage on line 10. The value of impedance 30 is accordingly irrelevant in this case.

Figure 3:
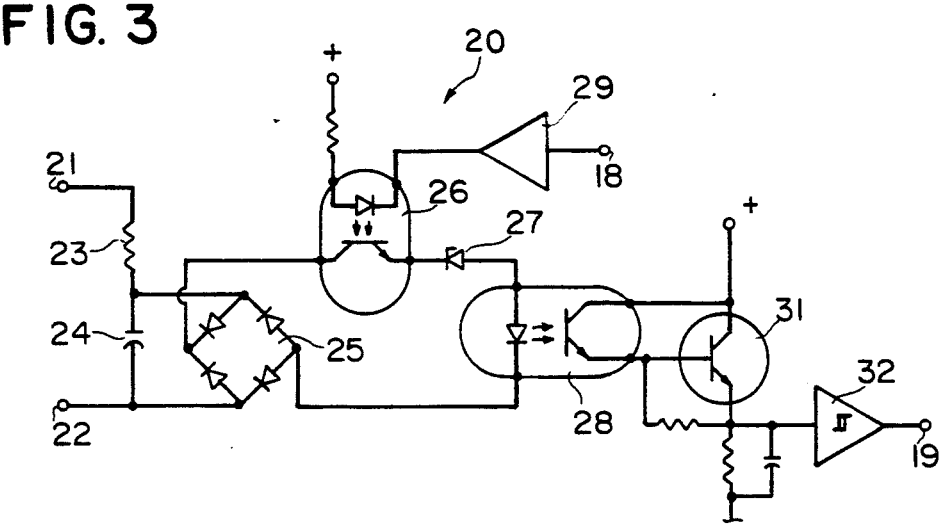
FIG. 3 is a circuit diagram for a second preferred embodiment of an apparatus for determining the state of a telephone line according to the invention.

Another embodiment of a line state detector according to the invention is shown in FIG. 3. A resistor 23 is in this case connected in series with a bipolar capacitor 24 to input terminals 21 and 22, which are connected to the wires 11 and 12 of the telephone line 10 as shown in FIG. 1. The resistance in resistor 23 is suitably about 5 Mohm, and the capacitance in capacitor 24 is suitably 0.1 $\mu$F. A rectifier bridge 25 are connected across capacitor 24, and the DC terminals of the rectifier bridge 25 are connected to a low-impedance voltage sensing circuit with a zener diode 27, with zener voltage about 20 V, in series with the control terminals of opto-coupler 28. The output terminals of a second opto-coupler 26 are connected in series with the voltage sensing circuit. The control terminals of opto-coupler 26 are connected to the data circuits 17 in modem 16 via polling channel 18 and a buffer amplifier 29. The output terminals of opto-coupler 28 are connected to the data circuits 17 via buffer stages 31, 32 and response channel 19. The opto-couplers 26 and 28 provide the required galvanic separation of components connected to the telephone line 10.

When the modem 16 is in standby mode, no control current flows in the control circuit of opto-coupler 26, so its output circuit is open. Capacitor 24 accordingly has zero load current. The capacitor 24 is charged via resistor 23 to an end voltage equal to the voltage between input terminals 21, 22, which is the same as the line voltage of the telephone line. The time constant of the charging circuit is about 0.5 second with the component data assumed above.

When the telephone 15 is On-Hook, the line voltage is about 50 volt, and the capacitor will be charged to more than 31 V within 0.5 second, and to near 50 V in a couple of seconds. If the telephone 15 is brought into Off-Hook state, the line voltage drops to less than 10 V, and the voltage on capacitor 24 drops from 50 V to below 23 V in less than 0.6 second, and to less than 10 V in a couple of seconds.

When modem 16 is activated, the data circuits 17 send a polling pulse via polling channel 18 to opto-coupler 26. This causes the output circuit of opto-coupler 26 to close, so the voltage sensing circuit is connected to the capacitor. The polarity of the voltage on capacitor 24 depends on the polarity of terminals 21, 22 in relation to wires 11, 12 in the telephone line 10, but the rectifier bridge 25 assures that the voltage after the bridge is opposed to the threshold voltage of the zener diode 27. The combined threshold voltage in zener diode 27, bridge diodes 25, and the control circuit of opto-coupler 28 effectively subtracts 23 V from the rectified voltage from capacitor 24.

If line 10 is in On-Hook state when the data circuits 17 poll the line state detector 20 via polling channel 18, the voltage on capacitor 24 is larger than the threshold voltage in the voltage sensing circuit, so a current will flow through the control circuit of opto-coupler 28, the output circuit of opto-coupler 28 will close, and a square pulse will be returned to the data circuits 17 via buffer amplifiers 31, 32 and the response channel 19.

If, on the other hand, line 10 is in Off-Hook state when the line state detector 20 is polled via polling channel 18, the combined threshold voltage in the voltage sensing circuit is larger than the voltage on capacitor 24, so no current will flow in the control circuit of opto-coupler 28, and no pulse will be returned to the data circuits 17 via the response channel 19.

The data circuits 17 are programmed to accept a pulse returned on response channel 19 after the line state detector 20 is polled via polling channel 18 as an indication that the line is On-Hook.

In actual operation, the line state detector shown in FIG. 3 draws zero current from the telephone line in On-Hook condition as long as opto-coupler 26 is open, not the maximum current obtained by dividing the line voltage by the resistance of resistor 23. This is because the charging of capacitor 24 will always be completed shortly after line 10 last went from Off-Hook to On-Hook state, or after a previous poll.

Only while the line state detector 20 is polled via polling channel 18, when opto-coupler 26 is closed, does the impedance load on line 10 fall to the resistance of resistor 23, which can be 5 Mohm or larger. Such a resistance load is acceptable on an On-Hook telephone line, even if the polling is not followed by a telephone device going Off-Hook.

If the telephone line 10 is in Off-Hook condition when the line state detector 20 is polled, the line current is already more than 10 mA, so a few microampere extra load would be unimportant. In reality, no current flows in the line state detector 20 according to the invention in this case. Capacitor 24 is not discharged when opto-coupler 26 is closed if the line 10 is in Off-Hook state, because the voltage on capacitor 24 then is lower than the combined threshold voltage in the discharge circuit.

An advantage of the circuit shown in FIG. 3, is that the maximum load on the telephone line 10 is always limited by resistor 23 to a current low enough to be acceptable on an On-Hook telephone line 10. This makes this embodiment of a line state detector according to the invention suitable for monitoring the state of a telephone line without intending to connect a telephone device. Testing for line state can be made as soon as capacitor 24 has been recharged after the last polling, or about once every second when the component values suggested above are used.

Resistor 23 can be replaced by an inductor if the polling pulse is short, and it can have a low resistance if monitoring is not required.

A current large enough to be detected by inexpensive current sensing devices, such as opto-couplers, is obtained according to the circuit of FIG. 3 by testing a capacitor voltage derived from the voltage on the telephone line 10 momentarily instead of continuously. The capacitor 24 transforms the very low current through a large resistance 23 over a time period measured in seconds to a much larger discharge current with a duration measured in milliseconds. This large discharge current can be detected directly by inexpensive sensors, such as opto-couplers, without need for amplification.

Figure 4:
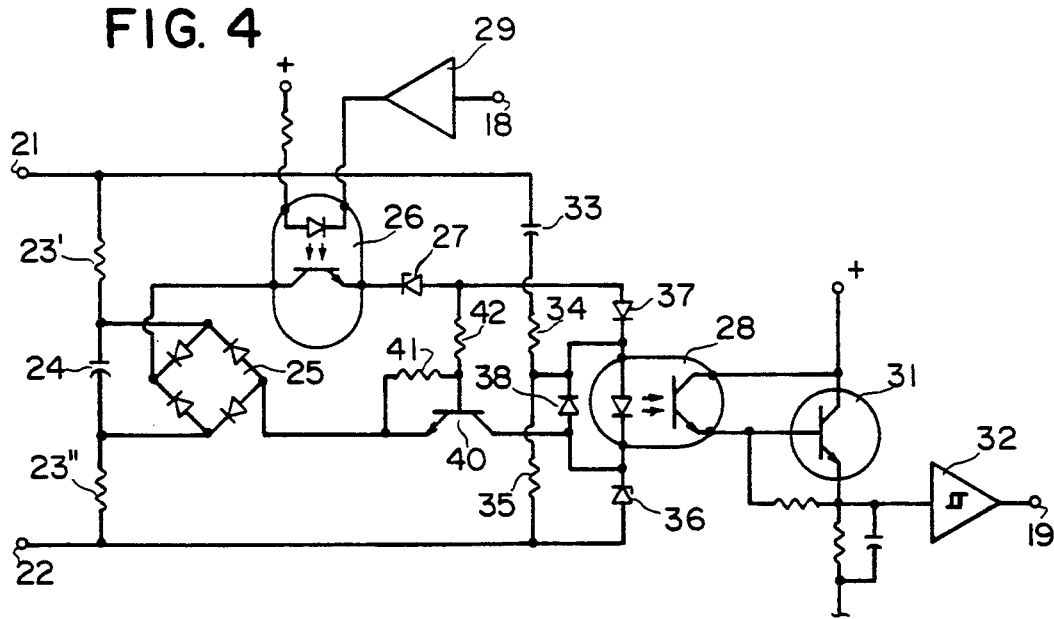
FIG. 4 is a circuit diagram for an apparatus for determining the state of a telephone line according to FIG. 3 combined with a ring detector circuit.

Modems usually are equipped to respond to incoming calls by closing relay 14 after a preset number of incoming ring signals. The ring signals are detected by a ring detector circuit. FIG. 4 shows how a line state detector according to the invention can be combined with a ring detector circuit for cost saving purposes.

In FIG. 4, all the components 23–32 of the line state detector shown in FIG. 3 are included, with unchanged functions, except that resistor 23 is split into two series connected resistor parts 23' and 23" to avoid capacitor 24 at poll time from being discharged through zener diode 36 when the polarity of the telephone line 10 is such that terminal 22 has a positive voltage relative to terminal 21. Diode 37 and transistor 40 are added to avoid capacitor 24 being discharged at idle time, between poll signals, through resistor 23" and zener diode 36 when the polarity of the telephone line 10 is such that terminal 22 has a positive voltage relative to terminal 21.

When the data circuits 17 send a polling signal via the polling channel 18 to opto-coupler 26, the output circuit of opto-coupler 28 closes, which opens a discharge circuit for capacitor 24, as explained in connection with FIG. 3. If line 10 is On-Hook when the polling is made, the voltage on capacitor 24 is larger than the combined threshold voltage in the discharge circuit, and a small current flows through resistors 42 and 41 so transistor 40 closes. This completes the discharge circuit from capacitor 24 through the control circuit of opto-coupler 28, and a square pulse is returned to the data circuits 17 via response channel 19, exactly as in the circuit of FIG. 3. The data circuits are programmed to recognize a pulse on response channel 19 following immediately after the polling signal confirmation that the line is On-Hook, and the Off-Hook relay 14 is closed by the data circuits 17, as explained above. If, on the other hand, line 10 is in Off-Hook state when polling is made, no signal is returned via response channel 19, and the modem waits.

Ring signals are AC signals, which are passed via a capacitor 33 to a voltage divider comprising resistors 34 and 35. The output from the voltage divider 34, 35 is fed to the control terminals of opto-coupler 28 in series with a zener diode 36. A diode 38 serves as a bypass for the control terminals of opto-coupler 28 during negative halfwaves of the ring signal. The voltage divider 34, 35 and the zener diode 36 block noise signals on the line 10, so they do not affect the control circuit of the opto-coupler 28, but genuine ring signals cause the opto-coupler 28 to close intermittently, so trains of square voltage pulses are trasmitted to the data circuits 17 in the modem via response channel 19. The data circuits 17 are programmed to recognize pulse trains on response channel 19 as ring signals, and the fact that these signals are received even though no polling pulse was sent via the polling channel 18 further confirms these signals as ring signals. The data circuits 17 will respond in known ways to the ring signals. This is not part of the invention, so further details are not required here.

The advantage of the circuit of FIG. 4 is that one opto-coupler 28 serves as detector of both line state and ring signals, which simplifies the circuits and lowers the cost of the circuits. The ring detector by itself is, however, not part of the present invention.

It should be noted, that bridge rectifier 25 in FIGS. 2, 3 and 4 is required only when the components 26, 27 and 28 are polarity dependent, such as the opto-couplers and the zener diode shown. Polarity dependent components are not required by the invention. The opto-coupler 26 can for instance be replaced by a relay, the zener diode 27 can be bipolar, and opto-coupler 28 can be replaced by any known current detector with a bipolar control circuit. If such components are used in the voltage sensing circuit, on bridge rectifier 25 is needed in a line state detector according to the invention.

Discrimination between low and high voltage need not be made directly by voltage comparison, as described in connection with FIGS. 2, 3 and 4. The sensing circuit can instead include a current sensor capable of discriminating between high discharge current, caused by high capacitor voltage, and a low current, caused by low capacitor voltage. Such current sensors are known in the art.

The invention does not require any special pulse duration for the polling signal on polling channel 18. A steady current via polling channel 18 while polling and while relay 14 is closed, is as satisfactory as a short polling pulse.

The invention is not limited to the preferred embodiments disclosed with reference to the Figures. The basic idea behind a line state detector according to the invention is to test a voltage derived from the voltage on line 10 by closing a switch in series with a voltage sensing means in response to a polling signal at the time the line state is to be determined. If a modem will go Off-Hook immediately after the line was found to be in On-Hook state, the voltage sensing means may draw a current large enough to trigger inexpensive low impedance current sensing devices, such as opto-couplers, directly from the line, since the following Off-Hook state in itself will draw an even higher current. If, on the other hand, a monitoring device needs to detect the line state without going Off-Hook immediately afterwards, the voltage sensing means is only allowed to cause a very low current drain on the line. This can be accomplished by charging a capacitor from the line through a large impedance, and then connect an inexpensive low impedance voltage sensing means to the capacitor voltage instead of directly to the line in response to a polling signal.

What is claimed is:

1. Apparatus for determining the state of a telephone line, comprising:
   (a) a voltage sensing device having a current sensing device in series with a zener diode;
   (b) a normally open switching device connected in series with said voltage sensing device, said series connected devices being connected to a voltage derived from said telephone line;
   (c) means for closing said switching device in response to a polling signal; and
   (d) a ring detector circuit connected to said telephone line, wherein said ring detector circuit includes said current sensing device.

2. Apparatus for determining the state of a telephone line as specified in claim 1, wherein said current sensing device comprises an opto-coupler.

3. Apparatus for determining the state of a telephone line, comprising:
   (a) a resistor,
   (b) a capacitor,
   (c) means for connecting said resistor in series with said capacitor across said telephone line,
   (d) a voltage sensing device including a current sensing device in series with a zener diode,
   (e) means for connecting said voltage sensing device to said capacitor in response to a polling signal, and
   (f) a ring detector circuit connected to said telephone line and including said current sensing device.

4. Apparatus for determining the state of a telephone line, comprising:
   (a) an inductance,
   (b) a capacitor,
   (c) means for connecting said inductance in series with said capacitor across said telephone line,
   (d) a voltage sensing device including a current sensing device in series with a zener diode,
   (e) means for connecting said voltage sensing device to said capacitor in response to a polling signal, and
   (f) a ring detector circuit connected to said telephone line and including said current sensing device.

* * * * *

UNITED STATES PATENT AND TRADEMARK OFFICE
CERTIFICATE OF CORRECTION

PATENT NO. : 5,140,631
DATED : August 18, 1992
INVENTOR(S) : KARL-ERIK STAHL

It is certified that error appears in the above-identified patent and that said Letters Patent is hereby corrected as shown below:

Abstract, line 4, after "line state" insert --will--.

Col. 4, line 22, "on" should be --no--;

line 39, After "of" insert --an--.

Col. 6, line 48, after "signal" insert --as--;

line 65, "trasmitted" should be --transmitted--.

Col. 7, line 20, "on" should be --no--.

Signed and Sealed this

Second Day of November, 1993

Attest:

BRUCE LEHMAN

Attesting Officer     Commissioner of Patents and Trademarks